United States Patent [19]

Markstein et al.

[11] Patent Number: 5,631,859

[45] Date of Patent: May 20, 1997

[54] FLOATING POINT ARITHMETIC UNIT HAVING LOGIC FOR QUAD PRECISION ARITHMETIC

[75] Inventors: Peter Markstein, Woodside, Calif.; Clemens Roothaan, Chicago, Ill.; Dennis Brzezinski, Sunnyvale, Calif.

[73] Assignee: Hewlett-Packard Company, Palo Alto, Calif.

[21] Appl. No.: 330,391

[22] Filed: Oct. 27, 1994

[51] Int. Cl.$^6$ .................. G06F 7/00; G06F 7/38
[52] U.S. Cl. .................. 364/748; 364/715.03
[58] Field of Search .................. 364/715.02, 715.03, 364/715.04, 745, 748, 749

[56] References Cited

U.S. PATENT DOCUMENTS

| | | | |
|---|---|---|---|
| 3,930,232 | 12/1975 | Wallach et al. | 395/500 |
| 4,041,292 | 8/1977 | Kindell | 364/760 |
| 4,722,068 | 1/1988 | Kuroda et al. | 364/757 |
| 5,341,321 | 8/1994 | Karp et al. | 364/748 |

OTHER PUBLICATIONS

Karp, A., "Speeding up N-body Calculations on Machines without Hardware Square Root", Document No. G320-3565, IBM Scientific Center, pp. 1–7 Apr. 1992.

Markstein, P. W., "Computation of Elementary Functiuons of the IBM RISC System/6000 Processor", IBM Journal of Research and Development, vol. 34, No. 1, Jan. 1990, pp. 111–119.

Primary Examiner—Chuong D. Ngo
Attorney, Agent, or Firm—Pehr Jansson

[57] ABSTRACT

A floating point processing system which uses a multiplier unit and an adder unit to perform properly rounded quad precision floating point arithmetic operations using double-extended hardware. The floating point processing system includes quad data muxes for converting a quantity between a quad precision representation and a two double-extended precision quantities and vice versa, wherein the sum, if added at infinite precision, of the two double-extended precision quantities is equal to the quad precision quantity. The floating point processing system further include hardware for performing arithmetic operations on double-extended precision quantities.

21 Claims, 6 Drawing Sheets

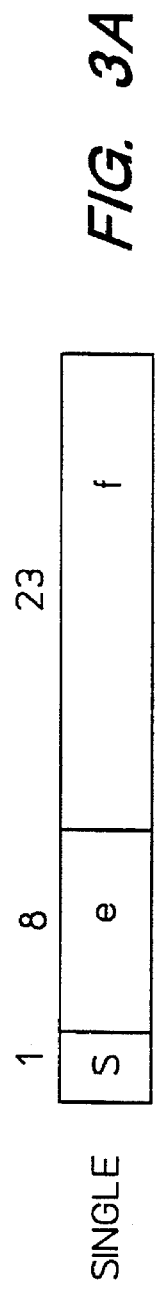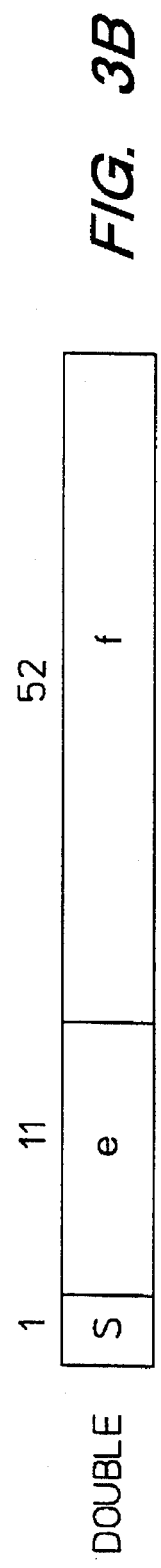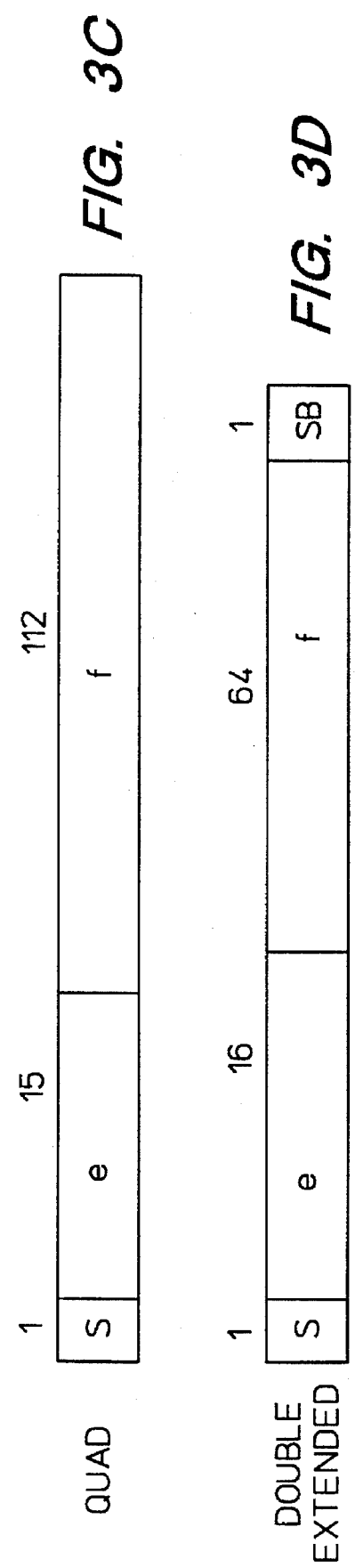

FLOATING POINT ARITHMETIC UNIT HAVING LOGIC FOR QUAD PRECISION ARITHMETIC

CROSS REFERENCE TO RELATED APPLICATIONS

The present patent application is related to Patent Application Ser. No. 08/058,164 with the title FLOATING POINT ARITHMETIC UNIT USING MODIFIED NEWTON-RAPHSON TECHNIQUE FOR DIVISION AND SQUARE ROOT, by Alan Karp et al., filed on May 5, 1993, which is incorporated herein by reference.

BACKGROUND OF THE INVENTION

1. Field of the Invention

The present invention relates to a data processing system having a floating point arithmetic unit and, more particularly, to a method and apparatus for performing quad precision floating point arithmetic operations on hardware implemented for less than quad precision.

2. Description of the Related Art

The arrival of computers has revolutionized the capabilities to perform complex numerical calculations rapidly. For example, before the availability of computers, weather forecasting was a practical impossibility. While theoretically possible, such forecasting requires many computations and, therefore, without the use of computers, takes so much time as to make the forecasts obsolete long before the computations could be finished. However, the availability of computers has made certain computations, such as weather forecasting, possible which without computers would have been impractical.

Nevertheless, even with early computers, some calculations were too time-consuming to be practical. Other calculations, even if executable at sufficiently high speeds on special purpose computers, would be too slow on general purpose computers. However, with improvement in microprocessor performance, many more types of calculations can be executed in a reasonable amount of time. During the late 1980's, the performance of microprocessor-based machines improved at a rate of between 1.5 and two times per year. It is likely that this trend will continue. It is therefore now possible to carry out computations that only a few years ago would have been excessively slow or only possible on supercomputers and other special purpose computers.

Many time-consuming calculations are iterative procedures. Iterative procedures are prone to inaccurate results because of accumulation of round-off error. In floating point arithmetic every calculation may introduce a certain amount of round-off error. A small loss of precision due to round-off error may grow to a large inaccuracy after several iterations.

One example of round-off error is the effect of representing irrational numbers in a fixed number of bits. The degree of accuracy in a final result is proportional to the number of digits of significand used for intermediate results. Because modern architectures make highly iterative procedures feasible, it is desirable to maintain the accuracy of the results of those procedures by allowing their intermediate results to be stored in a format having many digits of significand.

An additional motivation for long significands is the problem of arithmetic operations involving quantities of vastly differing magnitudes, e.g., the addition of a very small quantity to a very large quantity. Procedures for floating point addition usually align the significand of each operand so that both quantities have the same exponent. This step is followed by adding the significands. Next, if the significand addition results in an overflow, the procedure increments the exponent of the result. The significand alignment procedure requires shifting one (or both) significand(s). Shifting a significand may cause some bits of the significand to be lost. Such losses result from shifting the significand beyond the field available for significand storage. Therefore, it is desirable to allow larger significands by extending the range within which shifts may be made without an excessive loss of precision.

IEEE standard 754 specifies a fraction field of 23 bits for single precision and a fraction field of 52 bits for double precision. These formats correspond to approximately seven and sixteen significant decimal digits, respectively. There are calculations that are inaccurate even when using double precision. Therefore, it is desirable to provide means for yet higher precision floating point calculations.

It is possible to build hardware for quad precision, but such hardware is not generally desirable. Quad precision hardware would require 128-bit wide data paths and arithmetic logic units. These data paths and large ALUs use area on micro processor chips that could be used for other functions. Furthermore, wider data paths and ALUs take up larger chip areas, and wider data paths and ALUs imply longer execution delays. While for some calculations quad precision is either desirable or necessary, for other calculations double precision or single precision is adequate. Because of the wider data paths on true quad precision processors, the double and single precision calculations would be slower on such hardware than on single and double precision hardware.

It is therefore desirable to provide for fast quad precision calculations without unduly slowing double and single precision calculations.

It is possible to provide for quad precision calculations on double precision hardware without modification to the hardware. However, such implementations are undesirably slow because they rely heavily on software for carrying out quad precision calculations.

Thus, there is a need for an improved technique for allowing high precision calculations without slowing lower precision calculations.

SUMMARY OF THE INVENTION

Broadly speaking, the invention enables quad precision calculations on a double precision processor. The invention comprises a floating point unit for manipulating floating point numbers in a double-extended format. The floating point unit is operable to execute instructions for converting between true quad precision representation and double double-extended representation, in which a pair of numbers in double-extended format add to exactly an equivalent quad precision number. The floating point unit further executes instructions for correct rounding of floating point numbers in the double double-extended representation to any of the IEEE-754 specified rounding modes.

The invention provides users with tools for converting quad precision numbers into pairs of double-extended precision numbers. A defining property of the pairs of double-extended precision numbers is that when a pair of double-extended precision numbers are added, if added at infinite precision, the resulting sum is exactly equal to the corresponding quad precision number. A second defining property of double double-extended numbers is that the exponent of the larger order of the two numbers has an exponent that is at least n larger than the smaller number, where n is the number of bits in the significand of a double-extended word.

After converting a quad precision number into double double-extended representation, the user may perform arithmetic operations on the two double-extended precision numbers using double-extended hardware. The result of these arithmetic operations is another pair of double-extended precision numbers. The invention further provides tools for converting this resulting pair of double-extended precision numbers into an IEEE-754 properly rounded quad precision number.

Each of the double-extended numbers has an exponent field at least one bit wider than the exponent field of a quad precision number. Furthermore, in addition to the bits that conventionally are included in a double-extended precision number, in the present invention, each of the double-extended precision numbers includes an additional bit, the sticky bit. The sticky bit is used to round quad precision results properly in accordance with the IEEE-754 rounding modes.

As an apparatus, the invention is associated with a floating point arithmetic unit. The invention enables the floating point arithmetic unit to perform quad precision arithmetic on hardware designed for double-extended precision. The apparatus includes: a multiported storage device for storing data, arithmetic means for multiplying two numbers to produce a product and for adding two numbers to produce a sum; and microcode for a variety of quad precision arithmetic operations, including multiplication, addition, subtraction, division, and square root.

BRIEF DESCRIPTION OF THE DRAWINGS

The invention will be readily understood by the following detailed description in conjunction with the accompanying drawings, wherein like reference numerals designate like structural elements, and in which:

FIGS. 3(a)-3(d) illustrate various floating point formats;

DETAILED DESCRIPTION OF THE INVENTION

The invention is intended for use in a floating point arithmetic unit. The invention enables a floating point arithmetic unit to produce correct IEEE-754 results with a precision which is up to twice that offered by the hardware. Preferably, the invention yields a 2N-bit approximation (full precision) from an N-bit approximation (half precision). For example, if the hardware is able to provide the double precision results, the invention will provide quad precision results. The invention is equally applicable to multiprecision numbers. Multiprecision numbers are numbers having a precision greater than quad precision. These numbers may be stored in a single precision floating point array. In one implementation, the first word in the array is an integer valued floating point number whose absolute value represents the number of words in the mantissa. The sign of the first word is the sign of the multiprecision number. The next word is an integer valued floating point number representing the exponent of the number base. The decimal point follows the first mantissa word. Known software library routines are available to carry out mathematical operations on these numbers. See e.g., Bailey, *A Portable High Performance Multiprecision Package,* RNR Technical Report RNR-90-022, NASA Applied Research Branch, NASA Ames Research Center, Moffett Field, Calif., May 1992.

Embodiments of the invention are discussed below with reference to FIGS. 1–5. However, those skilled in the art will readily appreciate that the detailed description given herein with respect to these figures is for explanatory purposes as the invention extends beyond these limited embodiments.

Figure 1:
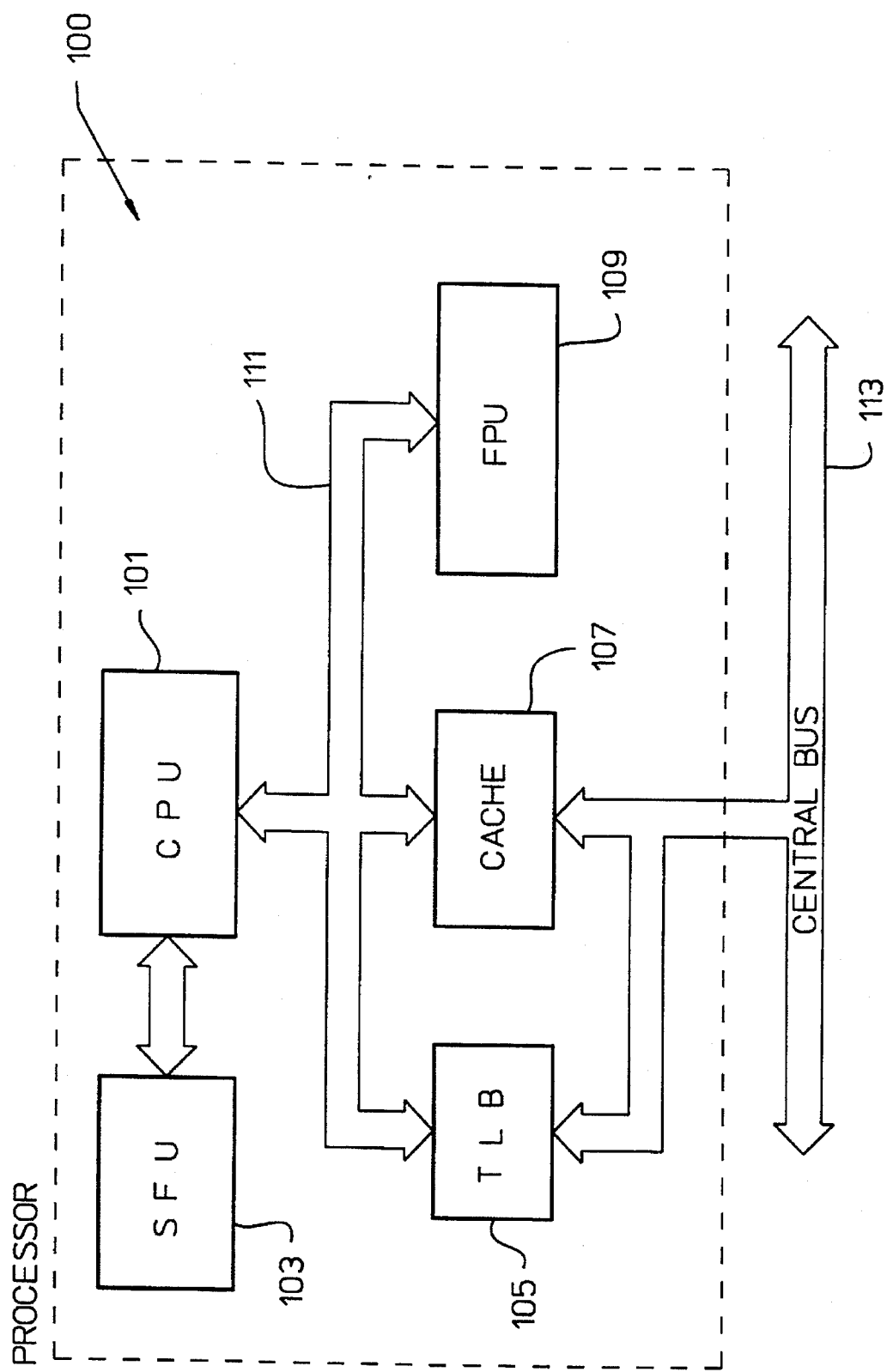
FIG. 1 is a block diagram of a processor having a floating point unit in accordance with a preferred embodiment of the invention.

FIG. 1 is a block diagram of a processor 100 incorporating a floating point unit for performing quad precision calculations using extended double-precision hardware. The processor 100 includes a central processing unit (CPU) 101 which is connected to at least one special function unit 103. The CPU 101 is further connected, via a bus 111, to a translation lookaside buffer (TLB) 105, a cache 107 and a floating point unit (FPU) 109. In a preferred embodiment, the FPU 109 is a multiply-add-fused (MAF) design FPU. The FPU 109 is discussed in greater detail below in conjunction with FIGS. 2 through 5.

The processor 100 is connected to other processors and peripheral devices via a central bus 113 which is connected to the cache 107 and to the TLB 105.

Figure 2A:
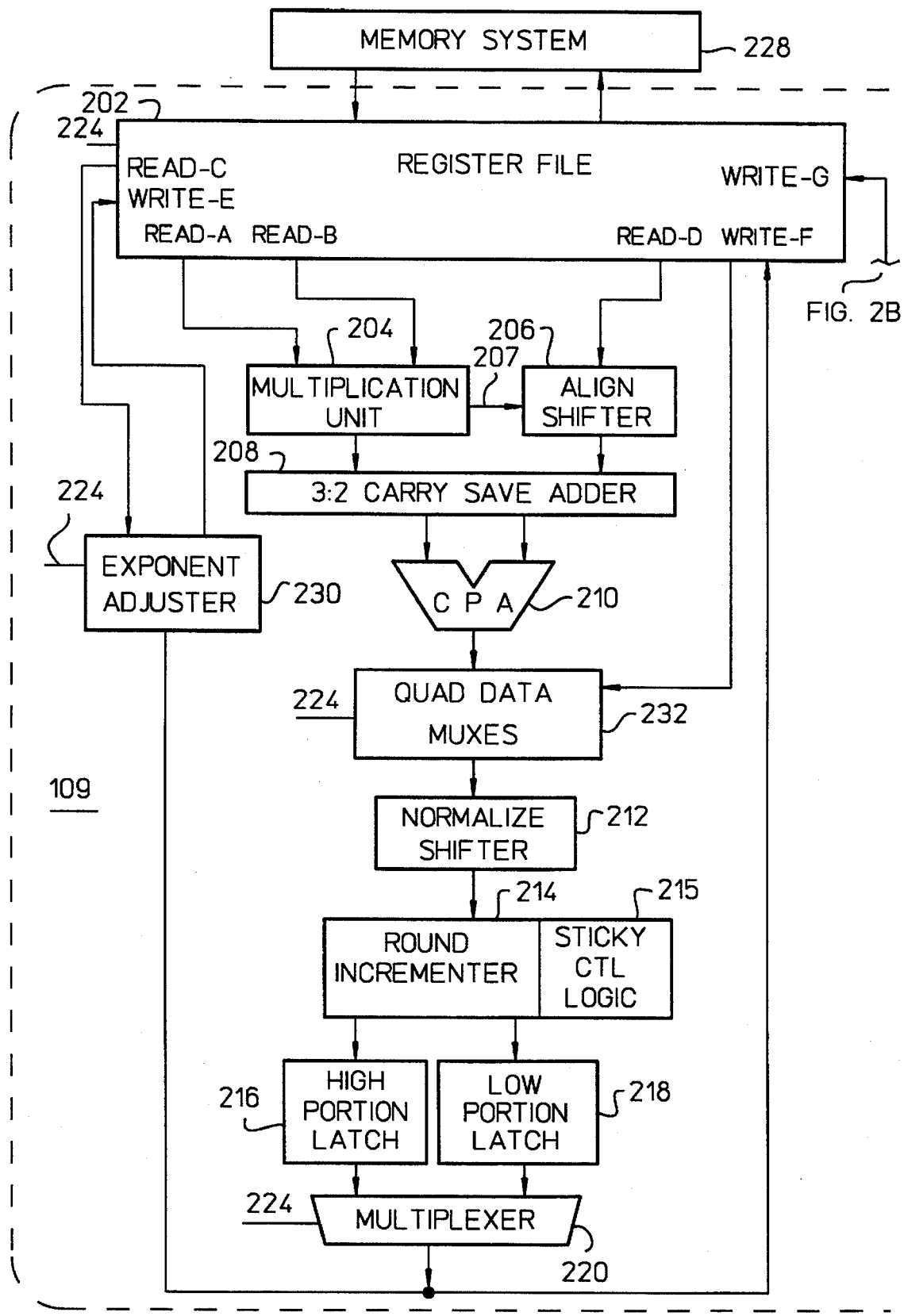
FIG. 2 is a block diagram of a floating point arithmetic unit in accordance with a preferred embodiment of the invention.
Figure 2B:
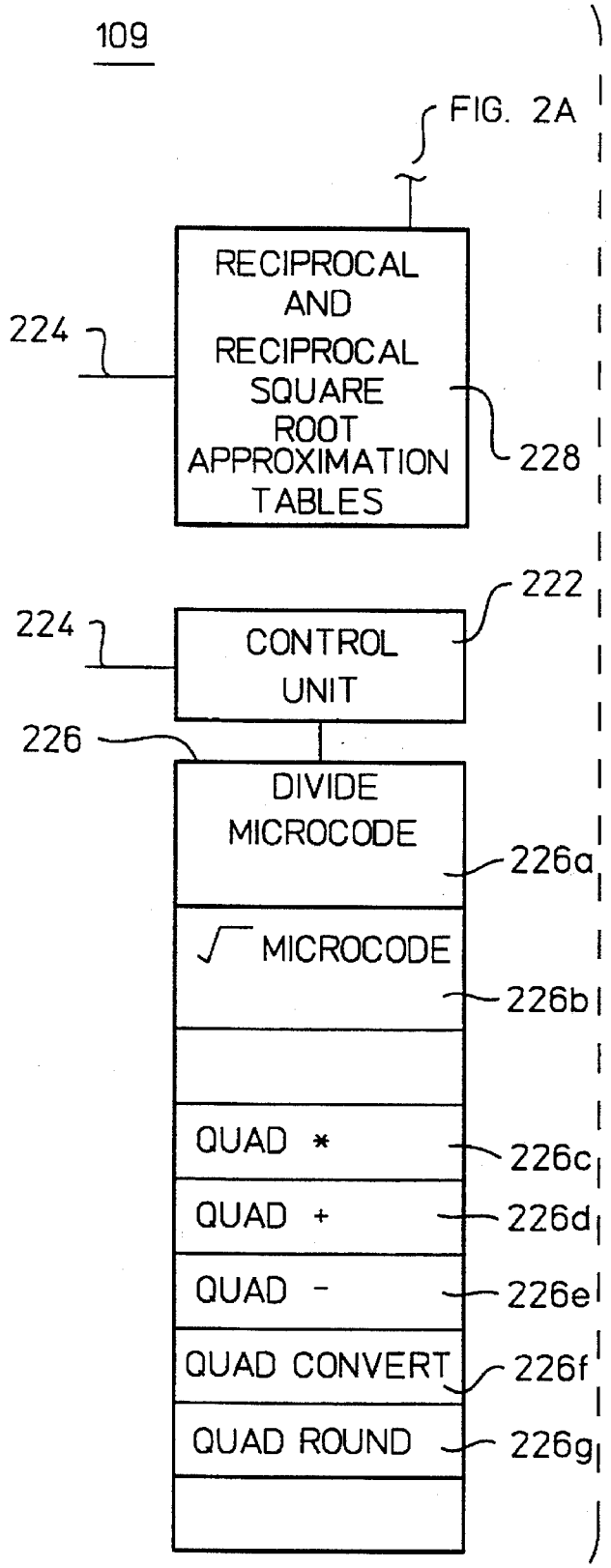

FIG. 2 is a block diagram of the floating point arithmetic unit 109 according to a preferred embodiment of the invention. The floating point arithmetic unit 109 illustrated in FIG. 2 is a multiply-add-fused (MAF) FPU. That is, a multiplication unit and an adder are fused together so that multiplication and addition may occur as one atomic operation, that is, the basic operation is a+b*c. Addition is performed as a+1*c and multiplication as 0+b*c.

The processor 100 has a working precision of N bits. In a preferred embodiment the working precision of the processor 100 is IEEE-754 double precision. FIGS. 3(a), 3(b), and 3(c) illustrate various floating point data types, and FIG. 3(d) illustrates one particular data format used by the processor 100. FIG. 3(a) shows the fields in an IEEE-754 standard single precision floating point format. It includes a single sign bit, an eight-bit exponent and a 23-bit fraction. FIG. 3(b) shows an IEEE-754 double precision format. It includes a single sign bit, an eleven-bit exponent, and a 52-bit fraction. FIG. 3(c) shows a quad precision format. It includes a single sign bit, a 15-bit exponent and a 112-bit fraction. The processor 100 stores a quad precision number in two adjacent 64-bit words in memory. FIG. 3(d) shows the format of an 81-bit double-extended floating point representation. The double-extended format includes a single sign bit, a 16-bit exponent, an explicit integer bit, and a 63 bit fraction. The format of FIG. 3(d) also includes a sticky bit (SB) which is described in detail below.

For illustrative purposes, the present invention is described as having a working precision of IEEE-754 double extended precision, i.e., a word width of 81 bits, and an extended precision equal to quad precision as defined above in FIG. 3d. A person skilled in the art will realize many alternatives to this example and the present invention should be read to encompass all such alternatives within the scope of the claims.

Figure 4:
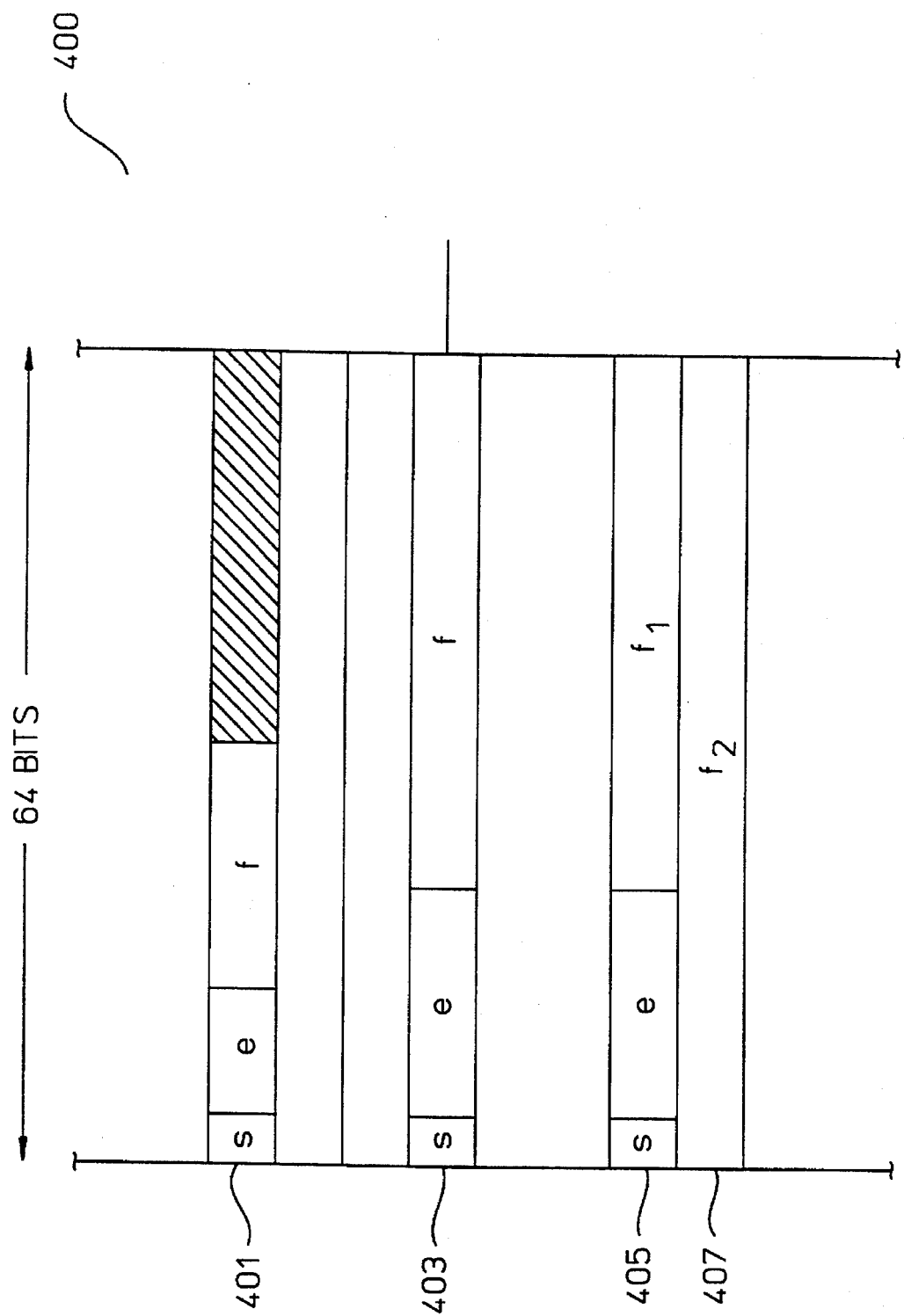
FIG. 4 is an illustration of a computer memory storing various floating point formats.

FIG. 4 illustrates a section of linear computer memory 400. As illustrated the memory is 64 bits wide, e.g., each memory address corresponds to a 64-bit quantity. In an alternative embodiment, each address corresponds to an 8-bit quantity (a byte) and each 64-bit word is 8 address locations from the next or previous 64-bit word.

At memory location 401 a single precision quantity is stored, wherein the sign bit, the exponent, and the fraction occupy half the width of the memory. In the case of the IEEE-754 standard single precision that corresponds to 32 bits out of a 64-bit wide memory. Memory location 403 illustrates an IEEE-754 double precision number. Memory locations 405 and 407 correspond to one quad precision number. The first memory location of this quad precision number contains the sign bit, the exponent and the most significant portion of the fraction, and the second memory location contains the rest of the fraction. Thus, when the two memory locations are concatenated, they correspond to the quad precision representation of a number.

Returning to FIG. 2, the FPU 109 is connected to a memory system 228 for loading information into a register file 202 and for storing information from the register file 202. The register file stores information in an extended double precision format as shown in FIG. 3(d). Thus, in the preferred embodiment each register in the register file 202 is 82 bits wide. Note that, each register in the register file 202 contains a bit referred to as the "sticky bit" (SB) which is used for correctly rounding numbers held in the registers. The "sticky bit" and rounding is discussed in detail below.

An operation to load a quad precision quantity from the memory 228 into the register file 202 causes a transfer of the first 64-bit word of the quad precision quantity from memory into the least significant 64 bits of one register and the second 64-bit word of the quad precision quantity from memory into the least significant 64 bits of a second register. In the preferred embodiment these transfers are usually accomplished with two instructions to allow full flexibility in register specification. However, in an alternative embodiment the transfer is accomplished with only one instruction and force even/odd address register pairing.

The multi-port register file 202 includes read ports A, B, C and D and write ports E, F and G. A multiplication unit 204 receives a multiplicand and a multiplier from read ports A and B and produces a product. An align shifter 206 receives an addend from read port D and aligns the addend in accordance with the exponent of the product using a signal 207 from the multiplication unit 204.

A 3:2 carry save adder 208 receives inputs from the multiplication unit 204 and the align shifter 206 and provides at least 2N-bits of output to a carry propagate adder 210. The invention only requires use of the leading 2N-bits from the carry save adder 208. The carry propagate adder 210 produces a 2N-bit result which is fed into a number of muxes, collectively labelled as quad data muxes 232. The quad data muxes 232 provide a mapping between various data formats. The mappings are discussed below in conjunction with FIGS. 3 and 4. The re-mapped output from the quad data muxes 232 is then normalized by a normalize shifter 212 and rounded to a 2N-bit result by a rounded incrementer 214. The rounded result is then supplied in two N-bit portions to a high portion latch 216 and a low portion latch 218, respectively. A multiplexer 220 receives the latched N-bit portions from the latches 216, 218. The output of the multiplexer 220 is connected to write port F of the register file 202 so that the two N-bits portions can be stored in the register file 202 in two write operations, one for the high portion and one for the low portion.

A control unit 222 receives and carries out instructions. More particularly, the control unit 222 controls the circuitry of the floating point arithmetic unit 109 using various control signals 224. The control unit 222 generates the control signals 224 based on microcode instructions stored in a microcode memory 226. The floating point arithmetic unit 109 is operable to carry out atomically a number of instructions which operate on double-extended precision numbers. These include taking the reciprocal of number (RECIP), multiplication of two numbers (FMPY), addition (FADD) and subtraction (FSUB) of two numbers, a fused multiply and addition (FMPYADD), a fused multiply and subtraction (FMPYSUB), and the negative of FMPYADD and FMPYSUB.

The microcode memory 226 also contains instructions for the quad precision instructions for divide 226a, square root 226b, multiplication 226c, addition 226d, and subtraction 226e. These quad precision arithmetic instructions are made-up from multiple double-extended instructions and require more than one cycle. The microcode memory 226 also contains instructions for conversion between quad and double double-extended formats 226f, and for quad precision rounding 226g.

Figure 5:
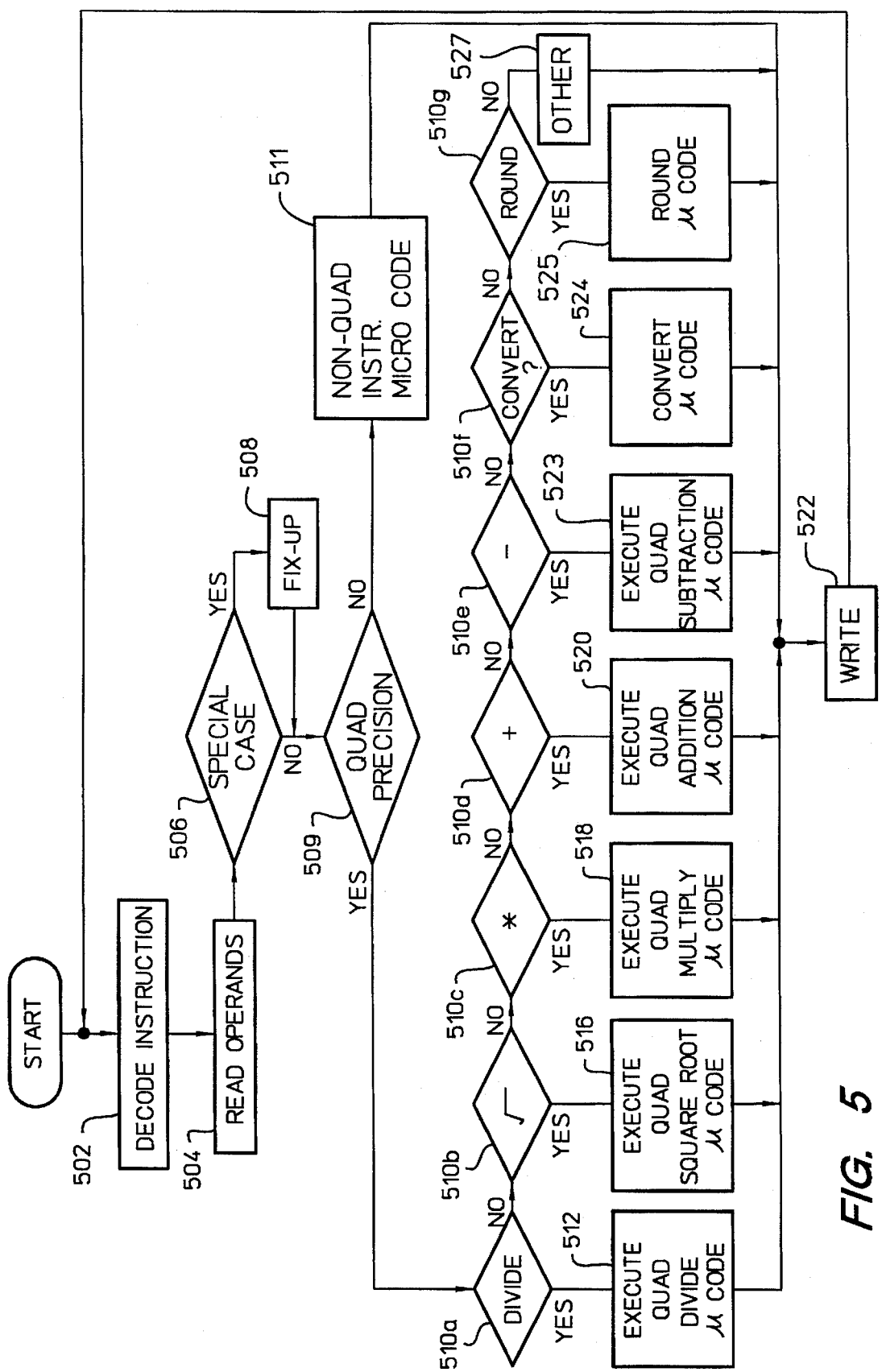
FIG. 5 is a flow chart of the basic operations performed by a control unit.

FIG. 5 is a flow chart of the basic procedures performed or controlled by the control unit 222. When the control unit 234 receives an instruction, various operations occur in the floating point arithmetic unit 109. Initially, the instruction is decoded 502 and its operands are read 504. Next, a decision 506 is made based on whether or not a special case exists. A special case exists when the operands are not normal numbers. If the operands are not normal numbers, the operations are "fixed-up" 508 according to the IEEE standard 754-1985 and then flow control continues as if the numbers were initially normal. For example, if one of the numbers is $0.02 \times 10^{-3}$, then it would be "fixed-up" (in this case normalized) to $0.2 \times 10^{-4}$ before processing continues.

Next, a decision 509 is made on whether or not the instruction is a quad arithmetic instruction. If the instruction is not a quad arithmetic instruction microcode corresponding to the non-quad instruction is executed 511. For example, if the instruction is determined to be an add or a multiply operation, then a multiply operation and/or an add operation are carried out in conventional fashion by the multiplication unit 204 and the adder 210 illustrated in FIG. 2. Otherwise, the type of quad instruction is determined 510a, 510b, 510c, 510d, 510e, 510f and 510g. If the instruction is a divide instruction, the control unit 222 executes 512 the divide microcode 226a. Upon completion of the divide microcode 226a, the control flow returns to step 502 for decoding of the next instruction. Similarly, if the instruction is a square root instruction, the control unit 222 executes 516 the square root microcode 226b and thereafter returns the control flow to step 502 for the decoding of the next instruction. Thereafter, a result is written 522 back to the register file 202 for temporary storage.

When the instruction received at the control unit 222 is either a divide instruction or a square root instruction, the control unit 222 accesses divide and square root microcode 226a and 226b, respectively, so as to execute the iterative procedures required to perform division and square root operations using multiplication and addition circuitry. Division and square root operations on quad precision numbers using double precision hardware is described in the copending patent application entitled FLOATING POINT ARITHMETIC UNIT USING MODIFIED NEWTON-RAPHSON TECHNIQUE FOR DIVISION AND SQUARE ROOT, which is incorporated herein by reference.

If it is determined that the instruction is one of the conversion instructions 510f, the appropriate conversion microcode 226f is executed 524. The floating point arithmetic unit is operable, by way of quad data muxes 232, to convert between quad representation and a double double-extended representation. The quad representation of the preferred embodiment is a 128-bit data format shown in FIG. 3(c). To perform quad precision arithmetic operations each quad precision quantity Q is converted into two double-extended precision quantities, as shown in FIG. 3(d), a high order word X and a low order word Y, such that X+Y, if added at infinite precision, would exactly equal Q. The high order double-extended word X has an exponent at least N larger than Y, where N is the number of bits in the significand of a double-extended word. In the preferred embodiment, N is 64.

The conversion from a quad representation into two double-extended precision quantities is performed by the quad data muxes 232 and the exponent adjuster 230 in response to two instructions: QCNVTF (Q,X) and QCNVTFL (Q,Y). In response to these instructions the control unit 222 sends signals 224 to the quad data muxes 232 and the exponent adjuster 230 to effectuate the corresponding conversions. The QCNVTF (Q,X) instruction instructs the quad data muxes 232 and the exponent adjuster 230 to produce the high order word X of the double double-extended representation of Q. The QCNVTFL (Q,Y) instruction instructs the quad data muxes 232 and the exponent adjuster 230 to produce the low order word Y of the double double-extended representation of Q.

Responsive to a QCNVTF instruction, the quad data muxes 232 map the sign bit of Q into the sign bit of X, map the high 64 bits of the significand of Q into the 64 bits of the fraction X, and sets the sticky bit of X to zero. The exponent adjuster 230 maps the exponent of Q into the low 15 bits of the exponent of X. The high 64 bits of the significand of Q includes the hidden bit (implied) and the 63 high bits of the fraction of Q which are explicitly represented.

Responsive to a QCNVTFL instruction, the quad data muxes 232 map the sign bit of Q into the sign bit of Y, map the low 49 bits of the significand of Q into to high 49 bits of the fraction of 'Y(X), sets the remaining 15 bits of the fraction of 'Y'(X) to zero, and sets the sticky bit of 'Y'(X) to zero. The exponent adjuster 230 adjusts the exponent of Y to be (64) less than the exponent of X and maps that quantity into Y. The conversion from two double-extended precision quantities into a quad representation is performed by the quad data muxes 232 and the exponent adjuster 230 in response to two instructions: FCNVTQ (X,Y,QH) and FCNVTQL(X,Y,QL). In response to these instructions the control unit 222 sends signals 224 to the quad data muxes 232 and the exponent adjuster 230 to effectuate the corresponding conversions. The FCNVTQ (X,Y,QH) instruction instructs the quad data muxes 232 and the exponent adjuster 230 to produce the high order word QH of the quad representation of Q. The high order word QH contains the sign bit, the 15-bit exponent, and the first 48 bits of the fraction. The FCNVTQL (X,Y, QL) instruction instructs the quad data muxes 232 and the exponent adjuster 230 to produce the low order word QL of the quad precision representation of Q. The low order word QL contains the low 64 bits of the fraction of the quad representation of Q. Thus, the concatenation of QH and QL is equivalent of the standard quad representation of Q.

Responsive to a FCNVTQ instruction, the control unit 222 instructs, using the signal 224, the multiplication unit 204, the align shifter 206, the 3:2 carry save adder 208, and the carry propagate adder 210, to add the two double-extended precision quantities X and Y. The quad data muxes 232 map the sign bit of the resulting quantity into the sign bit of QH, map the high 49 bits of the resulting significand into the fraction field of QH (48 bits allowing for an implicit leading one as the forty-ninth bit). The exponent adjuster 230 maps the exponent of the result from the addition into the low 15 bits of the exponent of QH.

Responsive to a FCNVTQL instruction, the control unit 222 instructs, using the signal 224, the multiplication unit 204, the align shifter 206, the 3:2 carry save adder 208, and the carry propagate adder 210, to add the two double-extended precision quantities X and Y. The quad data muxes 232 map the least significant 64 bits of the result into QL.

If it is determined that the instruction is a quad precision addition instruction 510d, the quad precision addition microcode 226d is executed 520. The addition of two quad precision quantities QX and QY commences with the conversion, using QCNVTF and QCNVTFL, into four double-extended precision words, lo_x, hi_x, lo_y, and hi_y, wherein, if added at infinite precision:

$$QX = hi\_x + lo\_x \quad (1)$$

$$QY = hi\_y + lo\_y \quad (2)$$

The addition of QX and QY (QX+QY=sum) is accomplished using the following equation:

$$hi\_sum + lo\_sum = lo\_x + lo\_y + hi\_x + hi\_y \quad (3)$$

The sticky bit, which is added to the double-extended format, is used to ensure proper rounding, in accordance with IEEE-754 rounding modes, of the result of any quad precision arithmetic operation. If any operation producing a double-extended quantity as a result would have a bit of lesser significand than the least significant bit set to one, the sticky bit is set to one. This usage of the sticky bit is best illustrated using a simplified example. For illustrative purposes a floating point format having one sign bit, two bits of exponent, five bits of fraction, and one sticky bit will be used. Suppose the addition of two binary floating point quantities:

100.00
001.0001

In the described format, these quantities would be represented as (without sticky bit):

```
s e f (s-Sign, e- exponent, f-fraction)
0 10 10000
0 00 10001
```

An addition operation would first adjust the two exponents by shifting the fraction of the second number by two binary places:

```
s e f r (s-sign, e-exponent, f-fraction, r-residue)
0 10 10000
0 10 00100 01
```

Thus, the least significant 1 of the second number is shifted out of the range of the fraction field of the given floating point format. The two fractions are added to produce the following result:

```
s e f r
```

```
                    0 10 10100 01
```

Because the result has a 1 set at a position which is less significant than the least significant bit of the fraction field of the format, the sticky bit of the result is set.

The sticky bit is used during rounding operations of quad precision quantities represented by two double-extended words. The present invention includes two rounding instructions: QRND (x, y, u, MODE) and QRNL (x, y, v, MODE). At the conclusion of the computation on pairs of double-extended numbers, the result is rounded to the number of bits of significand carried by a quad precision number. The significand of a quad precision number requires less than twice the number of bits carried in a double-extended number. The round operations return the result as another pair of double-extended numbers, in which the total number of significand bits equals the number of bits allowed in a quad format number, and where the low bits have been rounded according to a specified rounding mode. The sticky bits which are carried in each double-extended number are used to correctly round according to the specified mode.

The double double-extended representation of the present invention combines two double-extended words. Each double-extended word contains 64 bits of significand, namely, an explicit leading bit and 63 bits of fraction. The combined significand for the double double-extended representation is 128 bits. However, the quad representation of FIG. 3(c) requires only 113 bits of significand, namely, an implicit leading bit and 112 bits of fraction. The additional 15 bits of significand in the double double-extended representation are guard bits.

During arithmetic operations operand significand are shifted and operand exponents adjusted so that any addition and subtraction operands have the same exponent. As a significand is shifted to the right, the guard bits hold the portion of the significand shifted out of range of the given data format. The least significant guard digit is shifted into the sticky bit. When the sticky bit is set to one, because of a shift of a one from the least significant guard digit into the sticky bit, the sticky bit remains set to one.

The guard digits and the sticky bit are used during the round-to-nearest rounding mode. There are two types of round-to-nearest: round-to-nearest-even and round-to-nearest-odd. The difference between these two modes is whether a tie is resolved towards the nearest even or odd number. In most cases the round-to-nearest-even is used. Table 1 indicates the actions taken based on the value of the least significant bit of the significand (L), the round bit (R), the guard bits (G), and the sticky bit (S). The action bit (A) is the bit to be added to R to obtain proper rounding. In Table 1, "X" means "don't care", i.e., the value of the bit is not important, and "*" means that at least one of the guard bits has the value 1.

TABLE 1

| L | R | G | S | Action | A |
|---|---|---|---|--------|---|
| X | 0 | 0 | 0 | Exact result. No rounding necessary. | X |
| X | 0 | 0 | 1 | Inexact result, but significand is rounded properly. | X |
| X | 0 | * | X | Inexact result, but significand is rounded properly | X |
| 0 | 1 | 0 | 0 | The tie case with even significand. No rounding. | 0 |
| 1 | 1 | 0 | 0 | The tie case with odd significand. Round to nearest even. | 1 |
| X | 1 | 0 | 1 | Round to nearest by adding 1 to the L-bit. | 1 |
| X | 1 | * | X | Round to nearest by adding 1 to the L-bit | 1 |

When the control unit 222 encounters a rounding instruction 510g the rounding microcode 226g is executed by sending appropriate control signals 224 to the register file 202 to place the two double-extended quantities on appropriate output ports so as to cause the multiplication unit 204, the align shifter 206, the 3:2 carry save adder 208, and the carry propagate adder 210 to cause the addition of the two double-extended quantities 525.

Next the quad data muxes 232 pass the result from the addition onto the normalize shifter 212 where the result is normalized. The normalized result is then processed by the round incrementer 214. The round incrementer 214 includes sticky control logic 215. If either operand contained a sticky bit, or the sum contained a non-zero bit that cannot be represented in the outputs of the adder 210 or the normalize shifter 212 then the low order input bit to the round incrementer 214 is set to 1.

There are four IEEE-754 rounding modes: round-to-nearest, round-to-infinity, round-to-negative-infinity, and round-to-zero. The first mode, round-to-nearest, rounds to the closest representable number in the significand and rounds to an even value when the residue is exactly 0.5. Round-to-zero discards the fractional bits that do not fit the significand. This second possibility is commonly known as truncation. A third rounding mode is the round-to-positive infinity which means that the rounding is accomplished by rounding to the next largest representable number. The fourth possibility is round-to-negative infinity which rounds to the next smaller representative number. In practice, the round-to-nearest mode is most difficult to implement. These modes are specified in the rounding instructions as the MODE operand.

Next, the rounded result is mapped into the high portion latch 216 and the low portion latch 218. If the control unit 222 is processing a QRND instruction, the multiplexer 220, on control of control signal 224, stores the contents of the high portion latch back into the register file 202. If the control unit 222 is processing a QRNL instruction, the multiplexer 220, on control of control signal 224, stores the contents of the low portion latch 218 back into the register file 202.

Returning to quad precision addition, equation (3) is implemented using the following instruction sequence:

TABLE 2

| | | | | | |
|---|---|---|---|---|---|
| QCNVTF | , | x, | , | hi_x | |
| QCNVTFL | , | x, | , | lo_x | |
| QCNVTF | , | y, | , | hi_y | |
| QCNVTFL | , | y, | , | lo_y | |
| FADD | , | lo_x, | lo_, | a [RZ] | a <- lo_x+lo_y |
| FMPYADDSL | 1.0, | a, | hi_y, | lo_b [RZ] | lo_b <- a+hi_y |
| FADD | , | a, | hi_y, | hi_b [RZ] | hi_b <- a+hi_y |
| FADD | , | hi_x, | hi_b, | hi_c [RZ] | hi_c <- hi_x+hi_b |
| FMPYADDSL | 1.0, | hi_x, | hi_b, | lo_c [RZ] | lo_c <- hi_x+hi_b |
| FADD | , | lo_b, | lo_c, | lo_c [RZ] | lo_c <- lo_c+lo_b |
| FADD | , | lo_c, | hi_c, | hi_d [RZ] | hi_d <- lo_c+hi_c |
| FMPYADDSL | 1.0, | lo_c, | hi_c, | lo_d [RZ] | lo_d <- lo_c+hi_c |
| QRNL | mode, | hi_d, | lo_d, | lo_sum [R?] | lo_sum <- hi_d+lo_d[@113] |
| QRND | mode, | hi_d, | lo_d, | hi_sum [R?] | hi_sum <- hi_d+lo_d[@113] |
| FCNVTQH | , | lo_sum, | hi_sum, | qh | |
| FCNVTQL | , | lo_sum, | hi_sum, | ql | |

Each of the instructions implementing the quad precision addition sets the sticky bit of their respective intermediate results. The ordering of the instructions is important to ensure the proper propagation of the sticky bit from the least significant portion of the terms of the addition to the low portion of the result.

Each instruction is executed in a particular rounding mode. Note that all the intermediate operations are executed in round-to-zero mode (RZ). This insures monotonicity and enables the sticky control logic 215.

When an operation is performed in RZ mode, then if either operand has a non-zero sticky bit, or if the result is not exact, the sticky control logic 215 sets the sicky bit of the result to one. If the rounding mode is a rounding mode other than round-to-zero, the sticky bit of the result is set to 0.

If it is determined that the instruction is a quad precision subtraction instruction 510e, the quad precision subtraction microcode 226e is executed. The subtraction of two quad precision quantities QX and QY commences with the conversion, using QCNVTF and QCNVTFL, into four double-extended precision words, lo_x, hi_x, lo_y, and hi_y, wherein, if added at infinite precision:

$$QX = hi\_x + lo\_x \quad (4)$$

$$QY = hi\_y + lo\_y \quad (5)$$

The subtraction of QX and QY (QX−QY=rem) is accomplished using the following equation:

$$hi\_rem + lo\_rem = lo\_x - lo\_y + hi\_x - lo\_y \quad (6)$$

Equation (6) is implemented using the following instruction sequence:

TABLE 3

| | | | | | |
|---|---|---|---|---|---|
| QCNVTF | , | x, | , | hi_x | |
| QCNVTFL | , | x, | , | lo_x | |
| QCNVTF | , | y, | , | hi_y | |
| QCNVTFL | , | y, | , | lo_y | |
| FSUB | , | lo_x, | lo_y, | a [RZ] | a <- lo_x−lo_y |
| FMPYSUBSL | 1.0, | a, | hi_y, | lo_b [RZ] | lo_b <- a−hi_y |
| FSUB | , | a, | hi_y, | hi_b [RZ] | hi_b <- a−hi_y |
| FSUB | , | hi_x, | hi_b, | hi_c [RZ] | hi_c <- hi_x−hi_b |
| FMPYSUBSL | 1.0, | hi_x, | hi_b, | lo_c [RZ] | lo_c <- hi_x−hi_b |
| FADD | , | lo_b, | lo_c, | lo_c [RZ] | lo_c <- lo_c+lo_b |
| FADD | , | lo_c, | hi_c, | hi_d [RZ] | hi_d <- lo_c+hi_c |
| FMPYADDSL | 1.0, | lo_c, | hi_c, | lo_d [RZ] | lo_d <- lo_c+hi_c |
| QRNL | mode, | hi_d, | lo_d, | lo_sum [R?] | lo_sum <- hi_d+lo_d[@113] |
| QRND | mode, | hi_d, | lo_d, | hi_sum [R?] | hi_sum <- hi_d+lo_d[@113] |
| FCNVTQH | , | lo_sum, | hi_sum, | qh | |
| FCNVTQL | , | lo_sum, | hi_sum, | ql | |

If it is determined that the instruction is a quad precision multiplication instruction 510c, the quad precision multiplication microcode 226c is executed 518. The multiplication of two quad precision quantities QX and QY commences with the conversion, using QCNVTF and QCNVTFL, into four double-extended precision words, lo_x, hi_x, lo_y, and hi_y, wherein, if added at infinite precision:

$$QX = hi\_x + lo\_x \quad (7)$$

$$QY = hi\_y + lo\_y \quad (8)$$

The multiplication of QX and QY (QX*QY=p) is accomplished using the following equation:

$$hi\_p + lo\_p = lo\_x * lo\_y + hi\_x * lo\_y + lo\_x * hi\_y + hi\_x * hi\_y \quad (9)$$

Equation (9) is implemented using the following instruction sequence:

TABLE 4

| | | | | | |
|---|---|---|---|---|---|
| QCNVIF | , | x, | , | hi_x | |
| QCNVIFL | , | x, | , | lo_x | |
| QCNVIF | , | y, | , | hi_y | |
| QCNVIFL | , | y, | , | lo_y | |
| FMPY | lo_x, | lo_y, | , | a [RZ] | a <- lo_x*lo_y |
| FMPYADD | hi_x, | lo_y, | a, | hi_b [RZ] | hi_b <- hi_x*lo_y+a |
| FMPYADDSL | hi_x, | lo_y, | a, | lo_b [RZ] | lo_b <- hi_x*lo_y+a |
| FMPYADD | lo_x, | hi_y, | lo_b, | hi_c [RZ] | hi_c <- lo_x*hi_y+lo_b |
| FMPYADDSL | lo_x, | hi_y, | lo_b, | lo_c [RZ] | lo_c <- lo_x*hi_y+lo_b |
| FADD | , | hi_b, | lo_c, | hi_d [RZ] | hi_d <- hi_b+lo_C |
| FADD | , | hi_d, | hi_c, | hi_e [RZ] | hi_e <- hi_d+hi_c |
| FMPYADD | hi_x, | hi_y, | hi_e, | hi_f [RZ] | hi_f <- hi_x*hi_y+hi_e |
| FMPYADDSL | hi_x, | hi_y, | hi_e, | lo_f [RZ] | lo_f <- hi_x*hi_y+hi_e |
| QRND | , | lo_f, | hi_f, | hi_p [R?] | hi_p <- lo_f+hi_f[@113] |
| QRNL | , | lo_f, | hi_f, | lo_p [R?] | lo_p <- lo_f+hi_f[@113] |
| FCNVTQH | , | hi_p, | lo_p, | zh | |
| FCNVTQL | , | hi_p, | lo_p, | zl | |

Additional instructions, not discussed above, may also be executed in quad precision, step 527.

For performance reasons, the embodiment of FIGS. 1 and 2 may be further enhanced using well known circuitry. For example, to facilitate pipelining additional latches may be added between the register file and the multiplication unit or the align shifter. Multiplexers could also be inserted between the register file 202 and the multiplication unit 204 and the align shifter 206 so as to more quickly feed the multiplication unit or align shifter with inputs. Nevertheless, these and numerous other well known enhancements are not part of the invention but are primarily design choices for the hardware and for that reason are not discussed further herein.

The invention assumes that the hardware can provide all the digits in a product of two hardware precision numbers as well as the leading quad (e.g., 2N) precision part of a sum. Some existing computers have hardware instructions that return the quad precision result (i.e., all the digits) of multiplying two double precision numbers, other computers do not have such instructions. Some computers (e.g., IBM S/370) have instructions which return the quad precision part of the sum of two numbers.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of performing quad precision arithmetic in a computer having a memory having a plurality of cells, each cell storing a value, said computer having double precision hardware including a double precision memory, and double precision buses and a floating point unit having double-extended precision registers and a double-extended arithmetic logic unit, comprising the steps of:

(a) converting a first quad precision quantity into a first pair of double-extended precision quantities and storing said first pair of double-extended precision quantities into a first and a second double-extended precision container;

(b) performing at least one double-extended arithmetic operations on said first pair of double-extended precision quantities, thereby producing a second pair of double-extended precision quantities, and storing the results in a third and a fourth double-extended precision container; and (c) converting said second pair of double-extended precision quantities into a second quad precision quantity.

2. The method of claim 1, wherein said first quad precision quantity includes a sign bit, a plurality of exponent bits, and a plurality of fraction bits, and the step (a) of converting said first quad precision quantity, comprises the further steps of:

(a.1) assigning the value of said sign bit to a sign bit of said first double-extended quantity and to a sign bit of said first double-extended container;

(a.2) assigning the value of said exponent of said quad precision quantity to an exponent field of said first double-extended container;

(a.3) assigning the value of a first portion of said fraction to a fraction field of said first double-extended container;

(a.4) subtracting from the exponent of said quad precision quantity the length of the fraction field and storing the result in an exponent field of said second double-extended container;

(a.5) assigning the value of a second portion of said fraction to a fraction field of said second double-extended container; and (a.6) assigning the value zero to a sticky bit of said first double-extended container and to a sticky bit of said second double-extended container.

3. The method of claim 1, wherein said step (c) of converting said second pair of double-extended precision quantities, comprises the steps of:

(c.1) converting said second pair of double-extended precision quantities into a high portion of a quad precision quantity; and (c.2) converting said second pair of double-extended precision quantities into a low portion of a quad precision quantity.

4. The method of claim 3, wherein said step (c.1) comprises the steps of:

adding said pair of double-extended precision quantities to one another, thereby producing a sum having a sign bit, an exponent, and a fraction; and storing the sign bit, the exponent, and a most significant portion of the fraction of the sum in a double precision container.

5. The method of claim 3, wherein said step (c.2) comprises the steps of:

adding said pair of double-extended precision quantities to one another, thereby producing a sum having a sign bit, an exponent, and a fraction; and storing a least significant portion of the fraction of said sum in a double precision container.

6. The method of claim 1, wherein step b further comprises the step of:

(b.1) setting the sticky bit of said third double-extended container when at least one of said arithmetic operations alters the value stored in said third double-extended container and when said arithmetic operation produces a result having a significant digit beyond the range of said third double-extended container; and (b.2) setting the sticky bit of said fourth double-extended container when at least one of said arithmetic operations alters the value stored in said fourth double-extended container and when said arithmetic operation produces a result having a significant digit beyond the range of said fourth double-extended container.

7. The method of claim 6, further comprising the step of:

(d) using said sticky bit to round a quad precision quantity represented by a pair of double-extended quantities using one of several rounding modes.

8. The method of claim 7, wherein said several rounding modes include round-to-nearest, round-to-zero, round-to-positive-infinity, and round-to-negative-infinity.

9. The method of claim 8, wherein step (d) comprises the steps of:

adding said pair of double-extended quantities to produce a quad precision result having a sign bit, an exponent, a fraction, and a sticky bit;

storing the sign bit, the exponent, and a most significant portion of the fraction of said quad precision result in a first double-extended container;

storing the least significant portion of the fraction of said quad precision result in a second double-extended container; and for round-to-nearest, if the sticky bit of either of said pair of double-extended quantities is one, setting the least significant bit of said second double-extended container to one.

10. A method to effectuate quad precision arithmetic on a computer having double precision hardware including a double precision memory, and double precision buses, and a floating point unit having double-extended precision registers and a double-extended arithmetic logic unit, comprising the steps of:

(a) convert a first portion of a quad precision quantity into a first low order word of a double double-extended representation of said quad precision quantity;

(b) convert a second portion of said quad precision quantity into a first high order word of said double double-extended representation of said quad precision quantity;

(c) using said double-extended precision arithmetic logic unit to perform at least one double-extended precision arithmetic operation on said first high order word and on said first low order word utilizing an algorithm for obtaining quad precision results represented by a second low order double-extended precision number and a second high order double-extended precision number;

(d) convert said second low order word and said second high order word to a high part of a result quad precision quantity; and (e) convert said second low order word and said second high order word to a low part of said result quad precision quantity.

11. The method of claim 10, further comprising the steps of:

(a.1) loading said first portion of the quad precision quantity into a first of said double-extended registers with the contents of a first word in said memory; and (a.2) loading said second portion of the quad precision quantity into a second of said double-extended registers with the contents of a second word in said memory;

wherein said first word and said second word in combination represent one quad precision quantity.

12. An apparatus for performing quad precision arithmetic, comprising:

(a) a memory having double precision word width;

(b) a register file having double-extended word width;

(c) a load unit operable to transfer values from said memory to said register file;

(d) an arithmetic logic unit operable to perform arithmetic operations on double-extended quantities stored in said register file;

(e) a set of muxes connected to said arithmetic logic unit and operable to selectively transfer bits between a quad precision format and a double double-extended format;

(f) a control unit connected to said register file, said arithmetic logic unit, and said muxes; and (g) a micro code memory connected to said control unit and containing instructions for converting a quad precision quantity into a pair of double-extended quantities.

13. The apparatus of claim 12, further comprising:

(h) an exponent adjuster controlled by said control unit and connected to said register file, and operable to adjust an exponent of a quantity stored in said register file.

14. The apparatus of claim 12, further comprising:

(I) a normalize shifter connected to said set of muxes and operable shift an output from said set of muxes.

15. The apparatus of claim 12, wherein each quantity stored in said register file includes a sticky bit and wherein said arithmetic logic unit is operable to set said sticky bit when an arithmetic operation causes a result with binary significant digits beyond those representable in a double-extended precision word.

16. The apparatus of claim 15, further comprising:

(j) rounding logic connected to said normalize shifter and under the control of said control unit, and operable to round a floating point quantity according to a plurality of rounding modes.

17. The apparatus of claim 16, wherein said microcode memory includes instructions for causing said arithmetic logic unit to add two double-extended precision numbers and for causing said rounding logic to round said result according to one of a plurality of rounding modes, thereby producing a quad precision number.

18. The apparatus of claim 12, wherein said microcode memory includes instructions for performing quad precision arithmetic operations on two operands.

19. The apparatus of claim 12, wherein said microcode instructions for performing a quad precision arithmetic operation on two quad precision operands, wherein if performed at infinite precision said operation would result in the value Q, comprise:

instructions for converting a quad precision quantity into two double-extended precision quantities, wherein the sum of said two double-extended precision quantities substantially equals said quad precision quantity;

instructions for performing arithmetic operations on said two double-extended precision quantities, such as to produce two resulting double-extended precision quantities, wherein the sum of said two resulting double-extended precision quantities is substantially equal to Q; instructions for converting said two resulting double-extended precision quantities into one quad precision quantity stored into double precision words.

20. A general purpose computer, comprising:

(a) a central processing unit (CPU);

(b) a memory connected to said CPU and capable of storing quantities in quad precision; and (c) a floating point unit (FPU) connected to said CPU, having:
  1. a register file connected to said memory and capable of storing double-extended precision quantifies;
  2. an arithmetic logic unit connected to said register file and capable of carrying out arithmetic operations on double-extended precision quantities;
  3. a set of data muxes connected to said control unit and to said arithmetic logic unit and operable to convert a quad precision quantity into two double-extended quantities;
  4. a rounding incrementer connected to said arithmetic logic unit and operable to round a double-extended quantity according to any of a plurality of rounding modes;
  5. a microcode memory containing instructions for converting a quad precision quantity into a pair of double-extended quantities, instructions for performing arithmetic operations on double-extended quantities, instructions for converting from a pair of double-extended quantities to a quad precision quantity, and instructions for rounding a pair of double-extended quantities; and
  6. a control unit connected to said register file, to said arithmetic logic unit, said data muxes and said rounding incrementer, and controlled by microcode stored in said microcode memory to cause, selectively, said arithmetic logic unit to perform double-extended precision arithmetic operations, said set of data muxes to convert a quad precision quantity into a pair of double-extended precision quantities, said rounding incrementer to round double-extended precision quantities and quad precision quantities represented as a pair of double-extended precision quantities using one of several rounding modes.

21. A method of performing arithmetic at a first precision in a computer having a memory having a plurality of cells, each cell storing a value, said computer having second precision hardware including a second precision memory, and second precision buses, and a floating point unit having extended second precision registers and an extended second precision arithmetic logic unit, wherein quantities represent in said first precision contain 2n bits, quantities represented in said second precision contain n bits, and quantities in represented in said extended second precision contain more than n bits and less than 2n bits, comprising the steps of:

(a) converting a first precision quantity into a first pair of extended second precision quantities and storing said first pair of extended second precision quantities into a first and a second extended second precision container;

(b) performing at least one extended second precision arithmetic operations on said first pair of extended second precision quantities, thereby producing a second pair of extended second precision quantities, and storing the results in a third and a fourth extended second precision container; and (c) converting said second pair of extended second precision quantities into a second first precision quantity.

* * * * *